(12) United States Patent
Bettin et al.

(10) Patent No.: US 6,748,884 B1
(45) Date of Patent: Jun. 15, 2004

(54) AUTOMATIC LIQUID FERTILIZER RATE SYSTEM

(75) Inventors: Leonard A. Bettin, LaGrange Park, IL (US); Marvin L. Nelson, Lisle, IL (US); Brian D. Howe, Shelby Township, MI (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/453,338

(22) Filed: Jun. 3, 2003

(51) Int. Cl.[7] .......................... A01G 25/09; A01C 23/02
(52) U.S. Cl. ............................................ 111/119; 239/1
(58) Field of Search ........................ 111/118, 119, 120, 111/121, 127, 183–185, 900; 137/485, 486, 487.5, 489.5, 899; 239/155, 156, 63, 656, 11, 1; 222/57, 58, 63

(56) References Cited

U.S. PATENT DOCUMENTS

| | | | |
|---|---|---|---|
| 4,337,712 A | * 7/1982 | Michalko | 111/123 |
| 4,630,773 A | 12/1986 | Ortlin | 239/1 |
| 4,637,547 A | * 1/1987 | Hiniker et al. | 239/1 |
| 4,768,712 A | * 9/1988 | Terrell | 239/68 |
| 5,967,066 A | * 10/1999 | Giles et al. | 111/119 |
| 5,979,703 A | 11/1999 | Nystrom | 222/58 |
| 6,003,455 A | 12/1999 | Flamme | 111/200 |
| 6,061,618 A | 5/2000 | Hale | 701/50 |
| 6,269,757 B1 | * 8/2001 | Kiest | 111/119 |
| 6,325,005 B1 | 12/2001 | Crabb et al. | 111/185 |

* cited by examiner

Primary Examiner—Robert E. Pezzuto
(74) Attorney, Agent, or Firm—Rebecca Henkel; Brant T. Maurer

(57) ABSTRACT

A fertilizer system that employs an independent hydraulic motor and variable speed pump to deliver the selected application rate from the convenience of the operator's cab. The application rate can be changed while planting without changing seed population and the application rate can be controlled sectionally as well. The system may additionally be used in combination with more sophisticated multi-functional control systems that read maps and use GPS technology to control the entire preparation and planting operation.

12 Claims, 3 Drawing Sheets

LIQUID FERTILIZER CONTROL SYSTEM

AUTOMATIC LIQUID FERTILIZER RATE SYSTEM

BACKGROUND OF THE INVENTION

The present invention relates generally to agricultural seed planting systems, and more particularly to an automatic liquid fertilizer rate system that can be used with such a seed planting system to provide variable and on the go adjustment of fertilizer application rates.

A typical seed planting system includes a tractor coupled to tow a tool bar to which are attached in generally parallel, spaced apart relation, a plurality of planting units, each with a seed metering mechanism. Each planting unit typically includes a seed hopper for carrying a large quantity of seeds to be planted or a small container fed from a centralized large hopper, a device for opening a furrow in the ground as the tractor-drawn tool bar is advanced across the field over the ground, a seed meter coupled to the seed hopper for dispensing individual seeds into the furrow at a controlled rate, and a further device for moving soil at the sides of the furrow to close the furrow over the seeds.

During planting operation, the tractor typically moves across the field at speeds of about four to eight miles per hour. The spacing between adjacent individual seeds in each furrow can be as little as 0.5 inches or less, or as much as ten inches or more, depending upon the particular seed being planted. The seed metering mechanism is capable of dispensing seeds at various rates in the order of 130 seeds per second or greater, as well as at rates that are considerably less. The many different types of seeds to be plated using a seed metering mechanism include corn, cotton, sorghum, sugar beets, soybeans and sunflowers, to name a few. A successful seed planter is shown, for example, in U.S. Pat. No. 6,325,005. In fact, the system disclosed and claimed herein will work quite satisfactorily with the planter disclosed in that patent.

The planting operation, as shown in U.S. Pat. No. 6,325,005, starts with the residue manager (if equipped) removing material from the front of the double disc openers. The 14 inch staggered double disc opener cuts a narrow furrow. The leading disc easily cuts through trash. As the staggered disc openers bring moist soil to the surface, the grooved gauge wheels collect the soil and deposit it along each side of the furrow.

Control systems exist which manage the overall operation of an agricultural planter, i.e., control the subsystems that plant, fertilize and apply chemicals. Such systems, in their simpler forms, may control only seed population and spacing, liquid fertilizer flow rates, and granular chemical application rates. However, in their more complex and sophisticated forms, such systems may integrate map reading and Global Positioning System technology to control the various subsystems in a manner that satisfies the nutritional and chemical balances as they vary across the field to maximize crop emergence and growth. The present invention is primarily directed to a fertilizer application subsystem that may be used in a larger system that manages the overall planting functions. Attention is directed, by way of example, to the control system shown in U.S. Pat. No. 6,003,455 that would be indicative of the system of the instant invention. Generally, a larger overall control system for a planter of the type herein to be described would have a computer controller to manage the planting, fertilizing and chemical application processes of the planter. The controller would manage and monitor seed population and spacing, as well as liquid fertilizer and granular chemical application (if equipped). Ground speed, individual row unit seed delivery, vacuum level and seed and granular chemical hopper levels would also be monitored. Changing seed population or liquid fertilizer application rates without leaving the cab and modifying planting, fertilizing or chemical application rates are key benefits of direct hydraulic drive (as discussed further below).

Liquid fertilization is generally discussed as an application rate of gallons per acre, and is totally independent of seed population, ground speed or wheel slippage. This step, as it relates to the growing process, is, of course, very important in establishing the seed and young plants for adequate growth potential and success. Prior liquid fertilization systems have been relatively inconvenient to use and do not adjust on the go, i.e., adjustments of flow rates have not been easily accomplished form the operator's platform or cab.

It would be quite advantageous to provide a liquid fertilization system that overcomes the inconveniences of the prior art fertilization systems.

SUMMARY OF THE INVENTION

It is an object of this invention to provide an add-on fertilizer subsystem for an agricultural seed planting system.

It is an object of this invention to provide a liquid fertilizer system that makes available variable and on the go fertilizer flow rates.

It is another object of the instant invention to provide an add-on liquid fertilizer subsystem to an agricultural seed planting system that makes available variable and on the go fertilizer flow rates.

It is another object of the instant invention to provide a liquid fertilizer subsystem for an agricultural seed planting system that is driven directly by a hydraulic motor directly attached to a diaphragm pump.

It is a still further object of the instant invention to provide an apparatus for applying fertilizer to the seedbed of an agricultural seed-planting system, the apparatus being integratable with other control systems to provide on the go variations in fertilizer flow rates.

It is a still further object of the instant invention to provide a fertilizer subsystem operable independently or in combination with other control systems to selectively control the fertilizer flow rate.

It is a still further object of the invention to provide a fertilizer subsystem operable in combination with a GPS control system to vary the fertilizer flow rate across a field.

It is an even still further objection of this invention to employ a fertilizer subsystem operable in combination with a map-reading system to control the fertilizer flow rate across a field.

These and other objects are obtained by providing a fertilizer system that employs an independent hydraulic motor and variable speed pump to deliver the selected application rate from the convenience of the operator's cab. The application rate can be changed while planting without changing seed population and the application rate can be controlled sectionally as well. The system may additionally be used in combination with more sophisticated multifunctional control systems that read maps and use GPS technology to control the entire preparation and planting operation.

DETAILED DESCRIPTION OF THE PREFERRED EMBODIMENT

The terms "left" and "right", "up" or "upwardly" and "down" or "downwardly" are used herein for clarity and ease of description only. They refer to directions as relate to the machine, setting on the ground, facing in the normal direction of travel while in operation.

Figure 1:
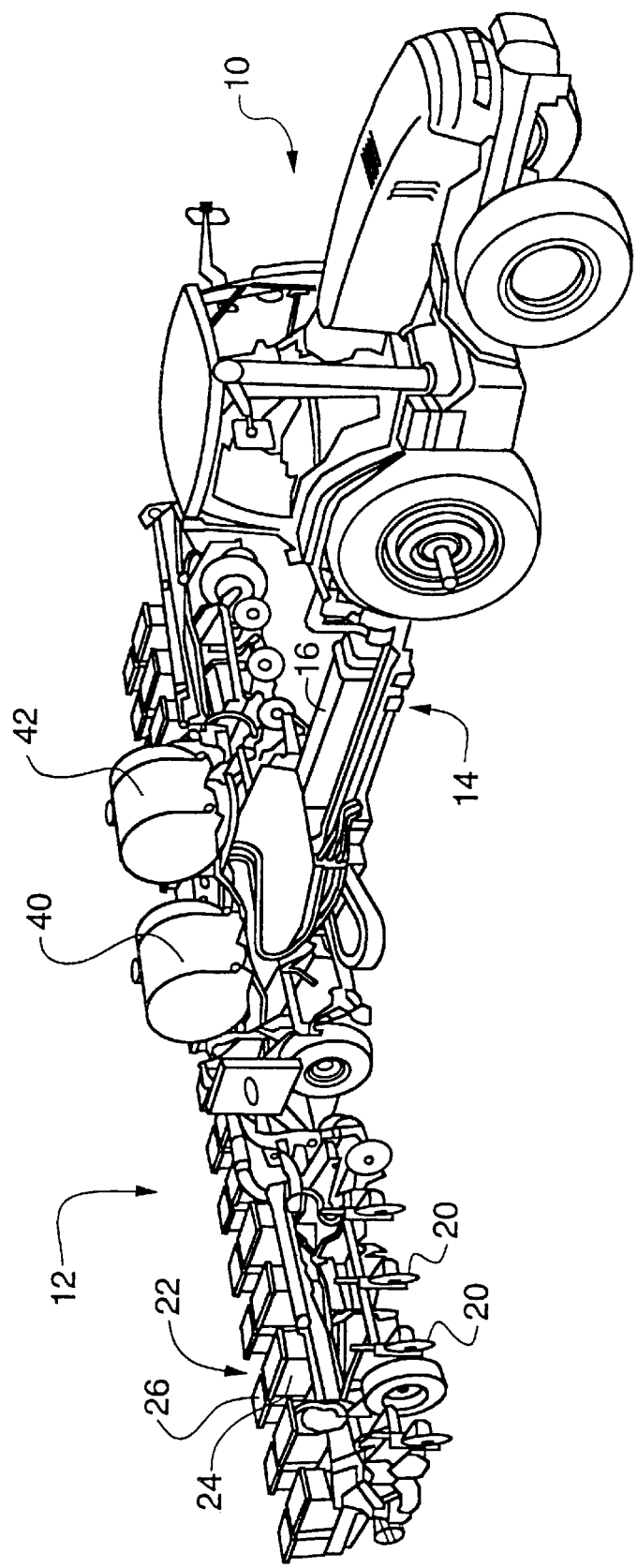
FIG. 1 is a perspective view of a tractor with two planting/fertilizer sections in operation in a field.

Referring now to FIG. 1 there is shown a conventional reasonably high horsepower (140+horsepower) tractor 10 pulling a pivot transport planter 12. A series of hydraulic conduits 14 extend from the tractor hydraulics rearwardly along a tongue 16 to the planter 12 to provide adequate hydraulic power thereto to support the various components and functions, such as hydraulic pumps and cylinders, raising and lowering, and pivoting into and out of a transport position. The operation of the fertilizer subsystem is the heart of this disclosure, so little detail will be provided concerning other subsystems, it being sufficient to note that generally the operation of known conventional components mentioned will work with the novel fertilizer subsystem being addressed.

On the forward lower portion of the planter is a series of generally equally spaced transverse coulters 20 to open the ground in a series of parallel furrows to receive seeds. A plurality of individual row units 22 are attached to and evenly spaced along the length of generally parallel tool bars, behind the coulters, to drop seeds from a hopper 24 into the furrow created by coulter 20. The row unit 22 may also apply granular chemicals to, or adjacent to, the furrow from hopper 26. An additional function associated with the planter is a mechanism for closing the furrow over the seed, and these are well known in the art.

Figure 2:
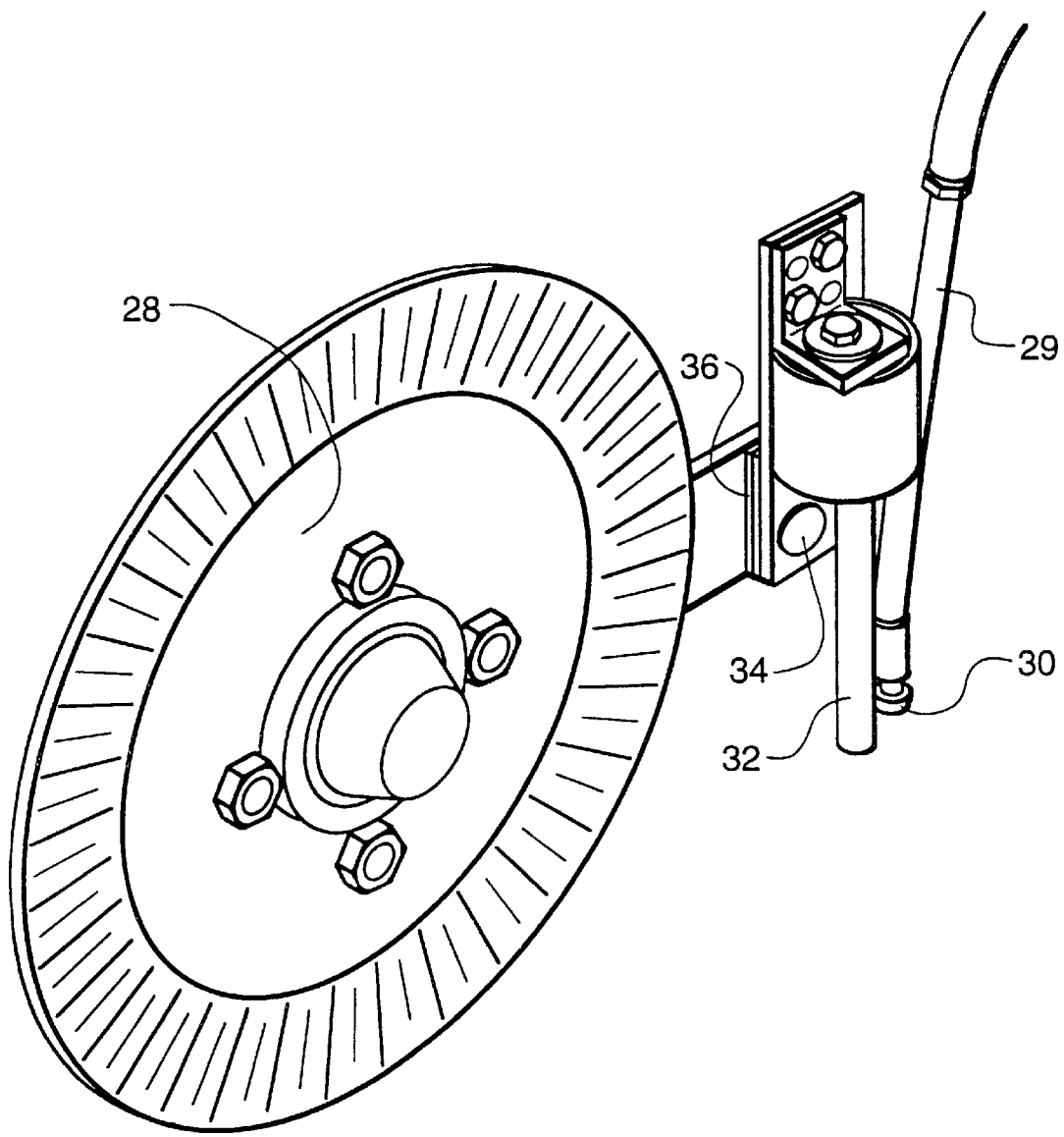
FIG. 2 is a perspective view of a coulter and injector.

Referring now to FIG. 2, the preferred mechanism for applying liquid fertilizer will be seen to include an injector 30 installed directly behind the fertilizer coulter 28 (or double disc openers as an alternative) on the applicator to inject a steady stream of fertilizer from tube 29 into the coulter opening. Fertilizer coulter 28 is a separate coulter from the furrow opener 20 and spaced to the side thereof to prevent liquid fertilizer from being placed directly on the seedbed. Raising and lowering the injector depth rod 32 in the adjusting holes 34 control injection depths, and the stream is centered on the coulter blade with shims 36. Other types of application mechanism, such as orifices, are suitable for use herein with adequate results. The selection of orifice/injector is largely made on the basis of intended planting speed and application rate. In general, as application rates approach the upper limits of system flow capability, less flow will be available to the recirculation circuit of the tanks, and that task may have to be partially closed down to maintain the desired field application rate.

Different sizes of injectors may be used to perform the final adjustment of fertilizer flow to the individual coulter applicator.

The planter shown in FIG. 1 uses planter-mounted fertilizer tanks 40 and 42 as a reservoir for liquid fertilizer to be applied. While this is certainly convenient, it is possible to use tanks mounted on the tractor itself.

Figure 3:
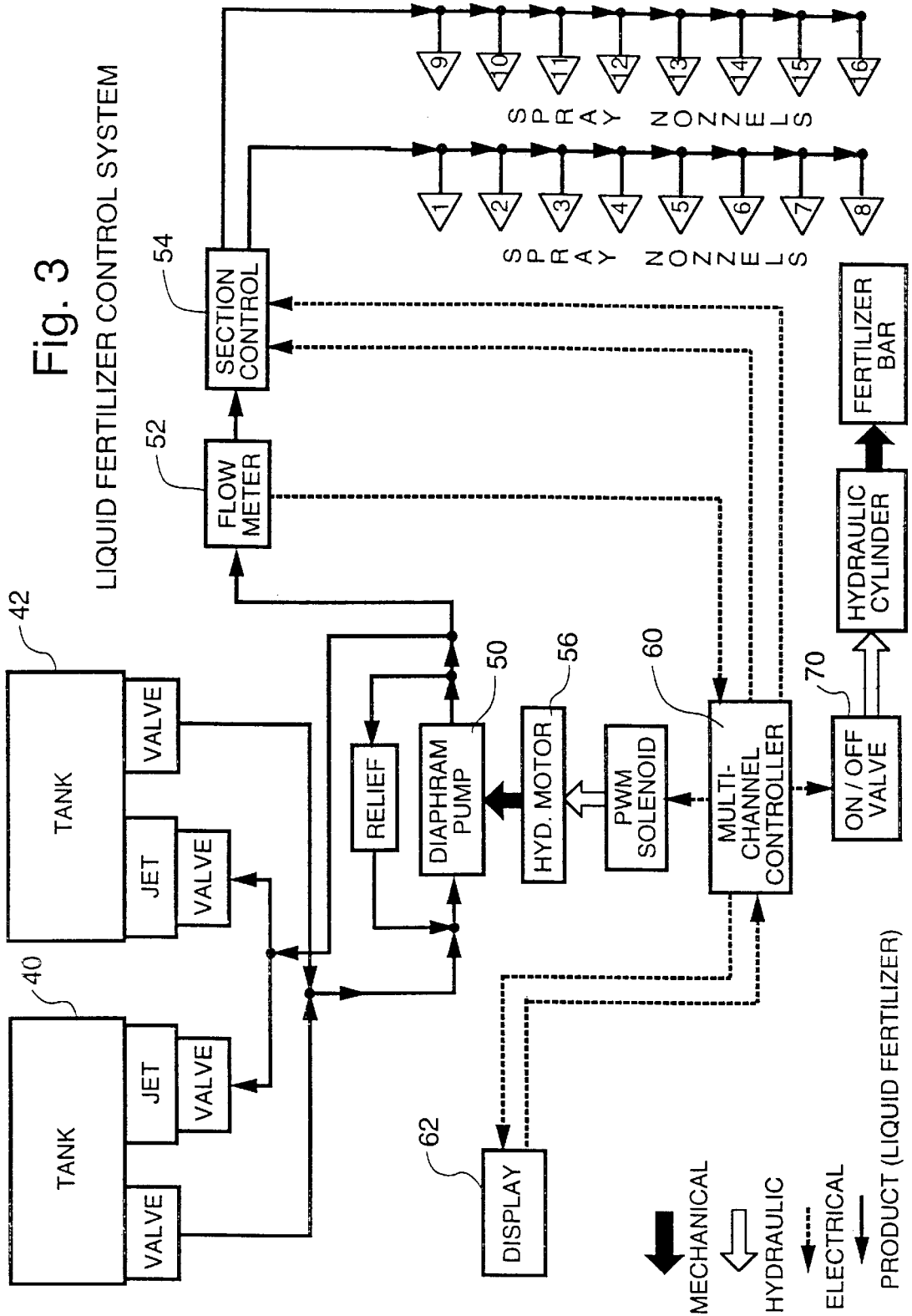
FIG. 3 is a flow diagram of the control system of the instant invention.

Referring now to FIG. 3, the liquid fertilizer flows from the tanks through the diaphragm pump 50 and out through flow meter 52 to the section control valve 54. From there it is displaced through a tee manifold as it flows to the rows so the fertilizer can be placed in the ground. The flow from each end of the tee manifold is controlled by separate valves (not shown) so that the flow from one valve splits to feed the row units from the centerline of the planter center section outward and the row units on the wing. Thus, the two sections can be selectively turned on and off on the go if the operator needs only half of the machine to be placing fertilizer at the time.

With the liquid fertilizer subsystem integrated in the overall planter shown, application rate is totally independent of seed population. The fertilizer system, with its independent hydraulic motor 56 and variable speed pump 50, will deliver the desired application rate with the convenience of in-cab control. The multi-channel controller 60 includes a computer device that opens and closes control valves and other control mechanisms in response to varying inputs from the operator and strategically located sensors. The primary input/output device is display 62 which may conveniently be a touchscreen display panel.

Importantly to the operation of the fertilizer application control system is flow meter 52 that measures electronically the fertilizer flow. Flow meter 52 is connected to controller 60 such that the control software can adjust the speed of hydraulic motor 56 based on the operator input—thus controlling the flow of fertilizer to row units 1–16 (as exemplified in FIG. 3). The operator adjusts the rate he desires to apply by making all adjustments from within the tractor cab by interfacing with display unit 62.

As can also be seen in FIG. 3, the operator may also manage on/off valve 70 to control the hydraulics that raise and lower the planter and fold it into position for transport.

It should be readily understood that the subsystem described may be incorporated in a much more complex overall control system for the planter, i.e., a system to manage generally all the functions of planting and fertilizing. This could, as explained above in the BACKGROUND OF THE INVENTION encompass additional sophisticated technology.

Many conventional elements or accessories known and used under normal circumstances have not be shown or discussed, but certainly would be employed under normal operating or transport conditions.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A system for controlling the application of liquid fertilizer in an agricultural planting implement, the system comprising:

an agricultural tractor coupled to said implement for pulling said implement across a field to be planted;

said tractor having an operator's cab thereon and a hydraulic pump providing hydraulic fluid flow to said implement;

a hydraulic motor affixed to said implement and in fluid flow communication with said hydraulic pump on said tractor, said hydraulic motor drivingly connected to, and dedicated fully to, a variable speed diaphragm pump also affixed to said implement, said diaphragm pump having an input and an output;

a reservoir of liquid fertilizer affixed to said implement or said tractor, a fertilizer conduit for carrying fertilizer from said reservoir to said input of said diaphragm pump;

at least one row unit on said planter for planting a row of seed in the field;

at least one fertilizer opener affixed to said implement for opening a furrow in the field adjacent said row of seed;

at least one applicator adjacent said fertilizer opener above said furrow, and a fertilizer hose means extending from said output of said diaphragm pump to said applicator;

a flow meter in said fertilizer hose means to sense the flow of fertilizer through said fertilizer hose means, and a control valve to adjust the flow of fertilizer through said fertilizer hose means;

an input/output device in said operator's cab; and a controller interconnecting said input/output device, said flow meter, said control valve and said hydraulic motor whereby the flow of liquid fertilizer to said applicator is monitored and controlled by said input/output device.

2. The system of claim 1, wherein:

said at least one row unit, fertilizer opener and applicator comprises a plurality of such components affixed to said implement generally transverse to the normal direction said tractor pulls said implement; and said fertilizer hose means comprises a plurality of tubes, one for each said plurality of row units.

3. The system of claim 2, wherein:

said input/output device is a touchscreen and said controller is a programmable computer.

4. The system of claim 3, wherein:

said row unit includes a mechanism for storing and planting seeds, and said controller is also interconnected with said mechanism for storing and planting seeds whereby the planting of seeds is controlled by said controller.

5. The system of claim 4, wherein:

said row unit includes a mechanism for storing and applying dry fertilizer, and said controller is also interconnected with said mechanism for storing and applying dry fertilizer, whereby the application of dry fertilizer is controlled by said controller.

6. The system of claim 5, wherein:

said controller includes map reading and GPS capabilities, whereby the planting of seeds, liquid fertilizer and dry fertilizer is coordinated with the parameters displayed on the map.

7. In an agricultural planting implement to be pulled across a field to be planted by an agricultural tractor, said tractor having an operator's cab thereon and a hydraulic pump providing hydraulic fluid flow to said implement, the improvement comprising:

a hydraulic motor affixed to said implement and in fluid flow communication with said hydraulic pump on said tractor, said hydraulic motor drivingly connected to, and dedicated fully to, a variable speed diaphragm pump also affixed to said implement, said diaphragm pump having an input and an output;

a reservoir of liquid fertilizer affixed to said implement or said tractor, a fertilizer conduit for carrying fertilizer from said reservoir to said input of said diaphragm pump;

at least one row unit on said planter for planting a row of seed in the field;

at least one fertilizer opener affixed to said implement for opening a furrow in the field adjacent said row of seed;

at least one applicator adjacent said fertilizer opener above said furrow, and a fertilizer hose means extending from said output of said diaphragm pump to said applicator;

a flow meter in said fertilizer hose means to sense the flow of fertilizer through said fertilizer hose means, and a control valve to adjust the flow of fertilizer through said fertilizer hose means;

an input/output device in said operator's cab; and a controller interconnecting said input/output device, said flow meter, said control valve and said hydraulic motor whereby the flow of liquid fertilizer to said applicator is monitored and controlled by said input/output device.

8. The system of claim 7, wherein:

said at least one row unit, fertilizer opener and applicator comprises a plurality of such components affixed to said implement generally transverse to the normal direction said tractor pulls said implement; and said fertilizer hose means comprises a plurality of tubes, one for each said plurality of row units.

9. The system of claim 8, wherein:

said input/output device is a touchscreen and said controller is a programmable computer.

10. The system of claim 9, wherein:

said row unit includes a mechanism for storing and planting seeds, and said controller is also interconnected with said mechanism for storing and planting seeds whereby the planting of seeds is controlled by said controller.

11. The system of claim 10, wherein:

said row unit includes a mechanism for storing and applying dry fertilizer, and said controller is also interconnected with said mechanism for storing and applying dry fertilizer, whereby the application of dry fertilizer is controlled by said controller.

12. The system of claim 11, wherein:

said controller includes map reading and GPS capabilities, whereby the planting of seeds, liquid fertilizer and dry fertilizer is coordinated with the parameters displayed on the map.

\* \* \* \* \*